United States Patent [19]

Omura et al.

[11] Patent Number: 4,873,321

[45] Date of Patent: Oct. 10, 1989

[54] MONAZO COMPOUNDS HAVING A TRIOZINYL BRIDGING GROUP AND TWO VINYLSULFONE TYPE FIBER REACTIVE GROUPS

[75] Inventors: Takashi Omura, Ashiya; Sadanobu Kikkawa; Toshihiko Morimitsu, both of Minoo; Naoki Harada, Suita; Tetsuya Miyamoto, Takatsuki, all of Japan

[73] Assignee: Sumitomo Chemical Company, Limited, Osaka, Japan

[21] Appl. No.: 102,497

[22] Filed: Sep. 29, 1987

[30] Foreign Application Priority Data

Oct. 17, 1986 [JP] Japan .................................. 61-248200
Feb. 20, 1987 [JP] Japan .................................. 62-38301

[51] Int. Cl.$^4$ .................... C09B 62/503; C09B 62/51; D06P 1/38; D06P 3/66
[52] U.S. Cl. .................................. 534/642; 534/598; 534/845; 534/860
[58] Field of Search ........................ 534/617, 628, 642

[56] References Cited

FOREIGN PATENT DOCUMENTS 0076782 4/1983 European Pat. Off. ............ 534/641
1350612 12/1963 France ................................ 534/641
59-96174 6/1984 Japan ................................. 534/638

OTHER PUBLICATIONS

Kagaku to Kougyo, vol. 42, No. 11, pp. 23–34 (1968).

Chemical Abstracts, vol. 101, 173024t (Abstract of Mitsubisi, JP-A-59-96176).

Primary Examiner—Floyd D. Higel
Attorney, Agent, or Firm—Stevens, Davis, Miller & Mosher

[57] ABSTRACT

A monoazo compound of the following formula,

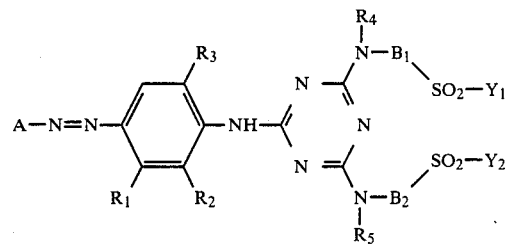

wherein A is phenyl or naphthyl, $B_1$ and $B_2$ are each phenylene or naphthylene, $R_1$ is hydrogen, halogeno, alkyl, alkoxy, ureido or acylamino, $R_2$ is hydrogen or takes together with $R_1$ to form benzene, $R_3$ is hydrogen, alkyl, alkoxy or sulfo, $R_4$ and $R_5$ are each hydrogen or alkyl, and $Y_1$ and $Y_2$ are each vinyl, sulfatoethyl or the like, which is useful for dyeing hydroxyl group-containing and amide-containing fiber materials to obtain dyed products of excellent fastness properties with excellent build-up property and reproducibility of dyeing irrespective of changes in dyeing temperatures, bath ratio or salt concentration in some degree.

11 Claims, No Drawings

MONAZO COMPOUNDS HAVING A TRIOZINYL BRIDGING GROUP AND TWO VINYLSULFONE TYPE FIBER REACTIVE GROUPS

The present invention relates to a monoazo compound, a process for the production thereof and a process for dyeing or printing fiber materials using the same. More specifically, the present invention relates to a monoazo compound having two vinylsulfone type fiber reactive groups per molecule, which is particularly useful for dyeing or printing fiber materials in a yellow color.

Many kinds of reactive dyes useful for dyeing or printing fiber materials in a yellow color are known. Of these, reactive dyes having a vinylfulfone type fiber reactive group are prominent. Particularly, phenyl- or naphthyl-azobenzene reactive dyes of this kind have been used much more than pyrazolone or pyridone reactive dyes because of their superior dye performances with respect to color values and fastness properties of dyed products.

For example, Published Unexamined Japanese Patent Application No. 96174/1974 discloses a naphthyl-azobenzene yellow reactive dye represented by the following formula in a free acid form,

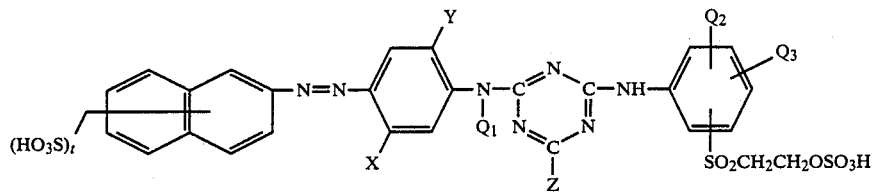

wherein $Q_1$ is hydrogen, methyl or ethyl, $Q_2$ and $Q_3$ are each hydrogen, methyl, methoxy or sulfo, X is hydrogen, methyl, acetylamino or chloro, Y is hydrogen, methoxy or ethoxy, and Z is aliphatic or aromatic amino having 1 or 2 sulfo groups. Moreover, in a literature "Kagaku to Kougyo" (Science and Industry), Vol. 42, No. 11, a naphthyl-azobenzene yellow reactive dye of the following formula,

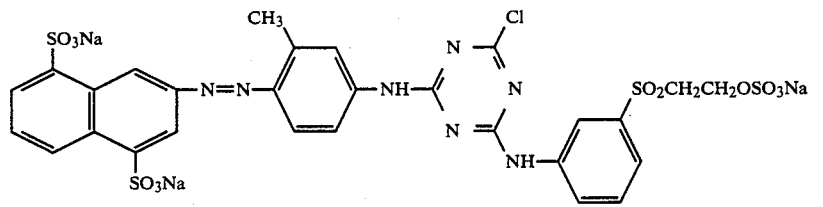

is disclosed,

However, these known reactive dyes are not yet sufficient to meet the needs of a high level of various dye performances.

In order to find a yellow reactive dye of this kind meeting the needs of a high level for various dye performances, the present inventors have undertaken extensive studies about substituents on the chromophore of phenyl- or naphthyl-azobenzene, and a bridging group between the chromophore and the vinylsulfone type fiber reactive group, and as a result have found a specific monoazo compound having two vinylsulfone type fiber reactive groups per molecule.

The present invention provides a compound of the following formula (I),

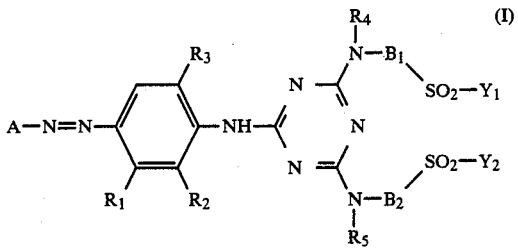

wherein A is a phenyl or naphthyl group substituted with at least one water-solubilizing group, $B_1$ and $B_2$ independently of one another are each an unsubstituted or substituted phenylene or naphthylene group, $R_1$ is hydrogen, halogeno, $C_{1-4}$ alkyl, $C_{1-4}$ alkoxy, ureido or acylamino, $R_2$ is hydrogen or taken together with $R_1$ forms a benzene ring unsubstituted or substituted with at least one sulfo, $R_3$ is hydrogen, $C_{1-4}$ alkyl, $C_{1-4}$ alkoxy or sulfo, $R_4$ and $R_5$ independently of one another are each hydrogen or unsubstituted or substituted alkyl, and $Y_1$ and $Y_2$ independently of one another are each vinyl or —$CH_2CH_2L$ in which L is a group splittable by the action of an alkali, and a process for producing the compound of the formula (I), which comprises subjecting any one of a monoazo intermediate compound of the following formula (II),

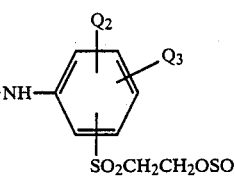

(II)

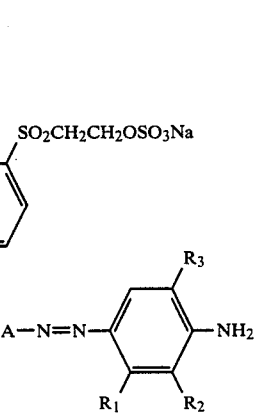

wherein A, $R_1$, $R_2$ and $R_3$ are as defined above, an amine compound of the following formula (III),

(III)

$$HN-B_1-SO_2-Y_1$$

wherein $B_1$, $R_4$ and $Y_1$ are as as defined above, and another amine compound of the following formula (IV),

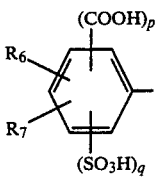

$$\begin{array}{c} R_5 \\ | \\ HN-B_2-SO_2-Y_2 \end{array} \quad (IV)$$

wherein $B_2$, $R_5$ and $Y_2$ are as defined above, to first condensation with a cyanuric halide followed by second and third condensations suing the remaining ones.

The present invention also provides a process for dyeing or printing fiber materials, which comprises using the compound of the formula (I).

In the above formula (I), the phenyl group represented by A may be preferably the one represented by the following formula,

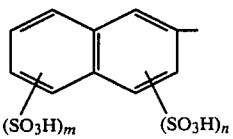

wherein $R_6$ and $R_7$ independently of one another are each hydrogen, chloro, methyl or methoxy, p is 0 or 1 and q is 1 or 2, provided that p+q is 1 or 2, and the naphthyl may be preferably the one represented by the following formula, wherein m is 1 ot 2 and n is 0 or 1, provided that m+n is 2 or 3.

The phenylene represented by $B_1$ and $B_2$ may be unsubstituted or substituted with methyl, ethyl, methoxy, ethoxy, halogeno (e.g. chloro, bromo etc.), sulfo or carboxy, and the naphthylene may be unsubstituted or substituted with one sulfo. Examples thereof are the same as those disclosed in Published Unexamined Japanese Patent Application No. 122549/1984. Of these, preferred are phenylene unsubstituted or substituted with methyl or methoxy.

The halogeno represented by $R_1$ includes, for example, chloro and bromo, and the acyl in the acylamino represented by $R_1$ includes, for example, $-COC_{1-4}$alkyl, $-COC_{2-4}$alkenyl, in which the alkyl and alkenyl are unsubstituted or substituted with sulfo, carboxy or halogeno, and benzoyl unsubstituted or substituted with sulfo, carboxy, methyl or halogeno. Among those represented by $R_1$, preferred are hydrogen, methyl, methoxy, ureido and amino substituted with acetyl, propionyl, $-COC_2H_4COOH$, $-COCH=CHCOOH$ or benzoyl. Afternatively, $R_1$ is preferably taken together with $R_2$ to form a benzene ring which is preferably substituted with one sulfo.

The alkyl and alkoxy represented by $R_3$ may be straight or branched, and unsubstituted or substituted with chloro or hydroxy. Of these alkyl and alkoxy, preferred are those having fewer carbon atoms, particularly methyl and methoxy.

With respect to the combination of $R_1$, $R_2$ and $R_3$, preferred are the case where $R_1$ is hydrogen, chloro, methyl, methoxy, ureido or amino substituted with acetyl, propionyl, $-COC_2H_4COOH$, $-COCH=CH-COOH$ or benzoyl, $R_2$ is hydrogen and $R_3$ is hydrogen, methyl or methoxy, and the case where $R_1$ is taken together with $R_2$ to form benzene ring substituted with one sulfo, and $R_3$ is hydrogen, methyl or methoxy.

The alkyl represented by $R_4$ and $R_5$ is preferably one having 1 to 4 carbon atoms, which is unsubstituted or substituted with hydroxy, cyano, $C_{1-4}$alkoxy, halogeno, carboxy, carbamoyl, $C_{1-4}$alkoxycarbonyl, $C_{1-4}$alkylcarbonyloxy, sulfo, sulfamoyl or the like. Examples thereof are the same as disclosed in Published Unexamined Japanese patent application No. 122549/1984. Of these alkyl groups, preferred are methyl and ethyl. In the present invention, any one of $R_4$ and $R_5$ is preferably hydrogen.

The symbol l in $-CH_2CH_2L$ which is represented by $Y_1$ and $Y_2$ denotes a group capable of being split by the action of an alkali, and includes various groups known per se, such as sulfato, thiosulfato, acetoxy, chloro and the like. Of these groups represented by $Y_1$ and $Y_2$, preferred is a β-sulfatoethyl group ($-CH_2CH_2OSO_3H$), which may be incorporated with a vinyl group ($-CH=CH_2$). In the present invention, the most preferred is a case where both $Y_1$ and $Y_2$ denote β-sulfatoethyl.

Among the monazo compounds represented by the formula (I), preferred are those represented by the following formulas (I-1) and (I-2) in each free acid form,

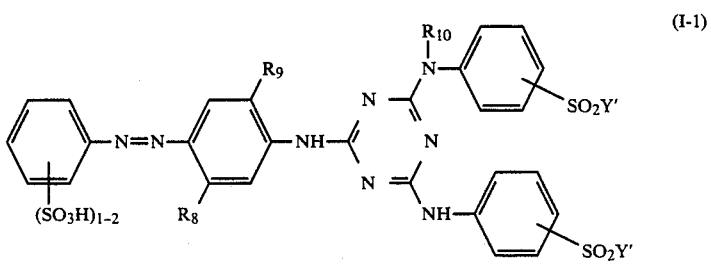

wherein $R_8$ is ureido or acetylamino and $R_9$ is hydrogen, or $R_8$ is methyl and $R_9$ is methoxy, and $R_{10}$ is hydrogen, methyl or ethyl, and Y' is vinyl ($-CH=CH_2$) or β-sulfatoethyl ($-CH_2CH_2OSO_3H$), and

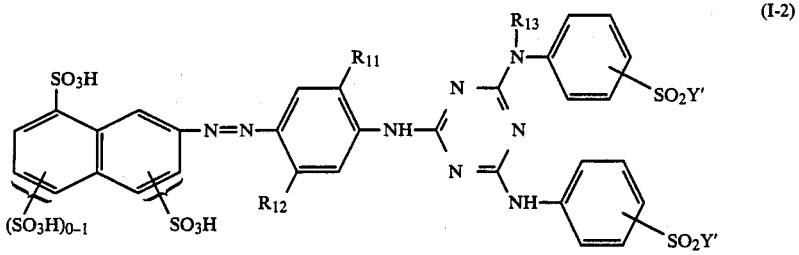
(I-2)

wherein $R_{11}$ is hydrogen and $R_{12}$ is ureido or acetylamino, or $R_{11}$ is methoxy and $R_{12}$ is methyl, and $R_{13}$ is hydrogen, methyl or ethyl, and $Y'$ is as defined above.

The monoazo compound (I) of the present invention can be produced in a manner known per se, for example, by subjecting the monoazo intermediate compound of the formula (II), the amine compound of the formula (III) and another amine compound of the formula (IV) to condensation in an optional order with a cyanuric halide such as cyanuric chloride and cyanuric fluoride. In this manner, the order to condensation is not particularly limited. Considering, however, the yield and quality of the monozao compound (I) obtained, it is preferred to use any one of (II), (III), and (IV) having the lowest reactivity to the cyanuric halide first of all for the condensation with the cyanuric halide.

A first condensation of any one of (II), (III) and (IV) with the cyanuric halide can be carried out in an aqueous medium at a temperature of −10° to 50° C., preferably 0° to 30° C., while controlling the pH within 1 to 10, preferably 2 to 7. A second condensation of any one of remaining two with the first condensate can be carried out in an aqueous medium at a temperature of 10° to 80° C., preferably 20° to 50° C., while controlling the pH within 2 to 9, preferably 3 to 6, and a third condensation of the last one with the second condensate in an aqueous medium at a temperature of 40° to 100° C., preferably 40° to 80° C., while controlling the pH within 2 to 9, preferably 3 to 6.

The monoazo intermediate compound (II) can be prepared by diazotizing an aromatic amine compound represented by the following formula (V), $$A-NH_2 \quad (V)$$

wherein A is as defined above, followed by coupling with an aniline compound represented by the following formula (VI),

(VI)

wherein $R_1$, $R_2$ and $R_3$ are as defined above, the diazotizing and coupling being carried out in a conventional manner.

Preferred examples of the aromatic amine compound (V) are aniline sulfonic acids and naphthylamine sulfonic acids, each being represented by the following formulas (VII) and (VIII), respectively, in each free acid form,

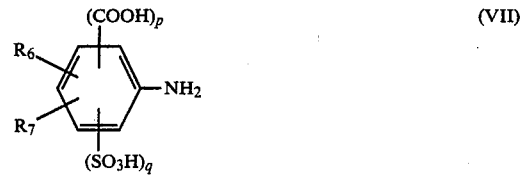
(VII)

wherein $R_6$, $R_7$, p and q are as defined above, and

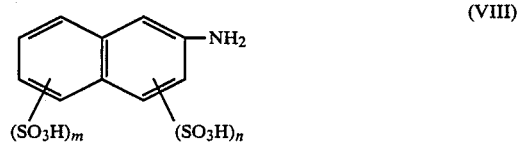
(VIII)

wherein m and n are as defined above.

The aniline sulfonic acid (VII) includes, for example, aniline-2-, 3- or 4- sulfonic acid, 2-amino-4- or 5-sulfobenzoic acid, 4-amino-2-sulfobenzoic acid, 4-methylaniline-2- or 3-sulfonic acid, 2-methylaniline-4- or 5-sulfonic acid, 2- or 4-aminobenzoic acid, 2-methoxyaniline-4- or 5-sulfonic acid, 4-methoxyaniline-2- or 3-sulfonic acid, 2-methyl-5- or 6-chloroaniline-4-sulfonic acid, 2-methyl-4-chloroaniline-5- or 6-sulfonic acid, 4-chloro-5-methylaniline-2-sulfonic acid, aniline-2,4- 2,5- or 3,5-disulfonic acid, 2-methylaniline-3,5-, 4,5- or 4,6-disulfonic acid, 4-methylaniline-2,5-disulfonic acid and the like.

The naphthylamine sulfonic acid (VIII) includes, for example, 2-naphthylamine-1,5-, 3,6-, 4,8-, 5,7- or 6,8-disulfonic acid, 2-naphthylamine-3,6,8- or 4,6,8-trisulfonic acid and the like.

The aniline compound (VI) includes, for example, m-anisidine, 3-methyl or ethylaniline, 2,5-xylidine, 2-ethyl-5-methylanilane, 2-methoxy-5-methyl or ethylaniline, 2-ethoxy-5-methyl or ethylanilane, 3-aminoacetanilide, 3-amino-4-methyl or ethylacetanilide, 3-amino-4-methoxy or ethoxyacetanilide, 3-carboxyethylcarbonyl or carboxyvinylcarbonylaminoaniline, 2-methyl-5-carboxyethycarbonyl or carboxyvinylcarbonylaminoaniline, 3-benzoylaminoaniline, 2-methyl-5-benzoylaminoaniline, those having a substituent such as chloro, methyl, nitro, sulfo or carboxy at o-, m- or p-position of the above benzoyl, 2,5-dimethoxyaniline, 3-aminophenylurea, 1-naphthylamine-6-, 7- or 8-sulfonic acid, 2-methoxy-1-naphthylamine-6-, 7- or 8-sulfonic acid, 3-aminoacetanilide-4-sulfonic acid, 3-aminophenylurea-4-sulfonic acid and the like.

All the starting compounds described above may be used in the form of a free acid or an alkali or alkaline earth metal salt depending on the reaction conditions.

After completion of the reactions, the monoazo compound (I)-containing reaction mixture may be subjected to salting-out in a conventional manner, demineralization with a semipermeable membrane, evaporation such as spray-drying and the like, if desired, with use of usual axiliary agents such as stabilizing agents, dyeing improvers and the like, to provide a pulverulent or liquid commercial product.

The monoazo compound (I) in accordance with the present invention may be in the form of a free acid or a salt of an alkali metal or alkaline earth metal, preferably in the form of sodium or potassium salt.

The monoazo compound (I) of the present invention is fiber-reactive and useful for dyeing or printing hydroxyl group-containing and amide group-containing materials. The materials are favorably in a fibrous form including unmixed or mixed fiber spinning.

The hydroxyl group-containing materials include natural or synthetic materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose-containing fiber materials are mixed fiber materials such as cellulose/polyester, cellulose/wool, cellulose/acryl and the like.

The amide group-containing materials include synthetic or natural polyamides and polyurethanes. Examples of the materials, particularly in the fibrous forms, are wool and other animal furs, silk, leather, polyamide-6,6, polyamide-6, polyamide-11 and polyamide-4.

The dyeing may be carried out in a manner suitable for the reactive group of the dyes.

For example, cellulose fibers can be dyed using the monoazo compound of the present invention and an acid binding agent such as sodium hydroxide, sodium carbonate, phosphates, silicates or sodium hydrogencarbonate. The dyeing may be carried out in a suitable manner, which can be selected from conventional ones depending on the physical and chemical properties of the fiber materials, and includes, for example, exhaustion dyeing, printing and padding including cold-pad-batch-up dyeing.

The exhaustion dyeing can be carried out at a relatively low temperature in the presence of an acid binding agent such as sodium carbonate, trisodium phosphate, sodium hydroxide and the like, together with sodium sulfate, sodium chloride or the like.

The printing can be carried out by printing the fibers with a color paste, followed by pre-drying and heat-treatment such as steaming. The color paste can be prepared in a conventional manner using a thickener or emulsion thickener such as sodium alginate, starch ether or the like, and an alkali or alkali-generating agent such as sodium carbonate, sodium hydrogencarbonate, trisodium phosphate, sodium trichloroacetate and their potassium or alkaline earth metal salts, if desired, together with a usual printing auxiliary agent such as urea and a dispersing agent.

The cold-pad-batch-up dyeing can be carried out by padding the fiber materials with a padding liquor at ambient temperature, batching up and allowing to stand on a roller for 3 hours or more or over night, followed by washing with water and drying.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as a condensation product between cyanuric chloride and 3 times by mole of aminobenzene-sulfonic acid or aminonaphthalenesulfonic acid, or an addition product between stearylamine and ethylene oxide, and the like.

The present monoazo compound (I) can be characterized by excellent dye performances in the dyeing and printing of fiber materials, particularly cellulose fiber materials. For example, the compound can give a dyed product excellent in light fastness, perspiration-light fastness, perspiration fastness, acid-hydrolysis fastness, washing fastness, chlorine fastness and the like. The monoazo compound (I) can also exhibit extremely excellent build-up, level-dyeing and washing-off properties. Moreover, when used for the dyeing or printing, the monoazo compound (I) is not greatly affected by changes in a dyeing temperature, an amount of inorganic salts and bath ratio, so that a dyed or printed product with constant quality can be obtained with superior reproducibility.

The present invention is illustrated in more detail with reference to the following Examples, which are only illustrative, but not limitative. In Examples, all parts and % are by weight.

EXAMPLE 1

Aniline-2,5-disulfonic acid (12.7 parts) was diazotized in a usual manner, followed by coupling with 3-aminophenylurea (7.6 parts). The resulting intermediate was subjected to a first condensation with cyanuric chloride (9.23 parts), followed by a second condensation with 1-aminobenzene-4-$\beta$-sulfatoethylsulfone (14.1 parts). Ultimately, the resulting condensate was allowed to react with 1-aminobenzene-3-$\beta$-sulfatoethylsulfone (14.1 parts) at 60° to 70° C. within a pH of 4 to 5. Salting-out with sodium chloride gave a monoazo compound represented by the following formula in a free acid form.

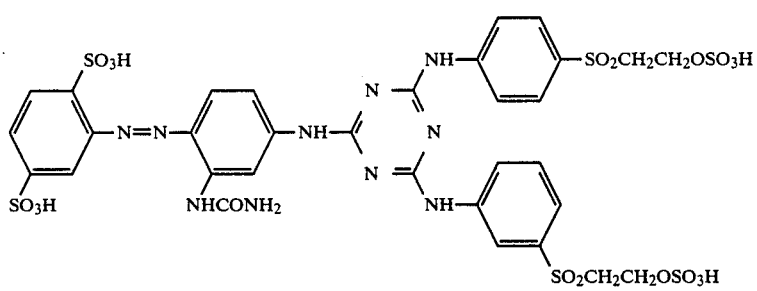

(λmax 380 nm)

EXAMPLE 2

Example 1 was repeated, but the aniline-2,5-disulfonic acid, 3-aminophenylurea, 1-aminobenzene-4-β-sulfatoethylsulfone and 1-aminobenzene-3-β-sulfatoethylsulfone which were used in Example 1 were replaced by the aromatic amine compound shown in Column A of the following table which corresponds to the formula (V), the aniline compound (VI) shown in Column B, the amine compound (III) shown in Column C and another amine compound (IV) shown in Column D, respectively, thereby obtaining the corresponding monoazo compound exhibiting a shade shown in Column E.

| Run No. | A Aromatic amine compound (V) | B Aniline compound (VI) | C Amine compound (III) | D Another amine compound (IV) | E Shade |
|---|---|---|---|---|---|
| 1 | Aniline-2,5-disulfonic acid | 3-Aminophenylurea | 1-Aminobenzene-3-β-sulfatoethylsulfone | 1-Aminobenzene-3-β-sulfatoethylsulfone | Yellow |
| 2 | " | " | " | 1-Amino-2-methoxybenzene-5-β-sulfatoethylsulfone | " |
| 3 | " | " | " | 1-Amino-4-methoxybenzene-3-β-sulfatoethylsulfone | " |
| 4 | " | " | 1-Aminobenzene-4-β-sulfatoethylsulfone | 1-Aminobenzene-4-β-sulfatoethylsulfone | " |
| 5 | " | " | " | 1-Amino-2-methoxybenzene-5-β-sulfatoethylsulfone | " |
| 6 | " | 3-Aminoacetanilide | " | 1-Aminobenzene-3-β-sulfatoethylsulfone | " |
| 7 | " | " | 1-Aminobenzene-3-β-sulfatoethylsulfone | " | " |
| 8 | " | 2-Methoxy-5-methylaniline | " | " | " |
| 9 | " | " | 1-Aminobenzene-4-β-sulfatoethylsulfone | " | " |
| 10 | " | 3-Carboxyvinylcarboxylaminoaniline | 1-Aminobenzene-3-β-sulfatoethylsulfone | " | " |
| 11 | " | 3-Carboxyethylcarboxylaminoaniline | " | 1-Aminobenzene-4-β-sulfatoethylsulfone | " |
| 12 | " | 2,5-Dimethylaniline | " | " | " |
| 13 | " | 2,5-Dimethoxyaniline | " | " | " |
| 14 | Aniline-2,4-disulfonic acid | 3-Aminophenylurea | 1-Aminobenzene-4-β-sulfatoethylsulfone | " | " |
| 15 | " | " | 1-Aminobenzene-3-β-sulfatoethylsulfone | 1-Aminobenzene-3-β-sulfatoethylsulfone | " |
| 16 | " | " | 1-Aminobenzene-4-β-sulfatoethylsulfone | " | " |
| 17 | Aniline-2-sulfonic acid | " | " | " | " |
| 18 | Aniline-3-sulfonic acid | 3-aminophenylurea | " | " | " |
| 19 | Aniline-4-sulfonic acid | " | " | " | " |
| 20 | Aniline-3,5-disulfonic acid | " | " | " | " |
| 21 | 4-Amino-2-sulfobenzoic acid | " | " | " | " |
| 22 | Aniline-2,5-disulfonic | 1-Aminonaphthalene-6- | " | " | Raddish yellow |

-continued

| Run No. | A Aromatic amine compound (V) | B Aniline compound (VI) | C Amine compound (III) | D Another amine compound (IV) | E Shade |
|---|---|---|---|---|---|
| | acid | sulfonic acid | | | |
| 23 | " | 1-Aminonaphtha-lene-8-sulfonic acid | " | " | " |
| 24 | " | 3-Amino-phenylurea | " | 1-N—Ethylamino-benzene-3-$\beta$-sulfatoethyl-sulfone | Yellow |
| 25 | " | " | 1-N—Ethylamino-benzene-4-$\beta$-sulfatoethyl-sulfone | " | " |
| 26 | " | " | " | 1-Aminobenzene-4-$\beta$-sulfatoethyl-sulfone | " |
| 27 | " | " | 1-N—Ethylamino-benzene-3-$\beta$-sulfatoethyl-sulfone | 1-Aminobenzene-3-$\beta$-sulfatoethyl sulfone | " |
| 28 | 4-Methoxy-aniline-2-sulfonic acid | 2-Methoxy-5-methyl-aniline | " | " | " |
| 29 | 2-Methyl-4-chloroaniline-6-sulfonic acid | 1-Amino-naphthalene-8-sulfonic acid | " | " | " |
| 30 | 4-Methyl-aniline-2,5-disulfonic acid | 3-Amino-phenylurea | 1-Aminobenzene-4-vinylsulfone | " | " |
| 31 | 2-Methyl-aniline-4,6-disulfonic acid | " | 1-Aminobenzene-4-$\beta$-sulfato-ethylsulfone | 1-Aminobenzene-3-vinylsulfone | " |
| 32 | Aniline-2,5-disulfonic acid | 3-Aminoacet-anilide-4-sulfonic acid | " | " | " |
| 33 | " | 3-Amino-phenylurea | 2-Aminonaph-thalene-6-$\beta$-sulfatoethyl-sulfone | 1-Aminobenzene-3-$\beta$-sulfatoethyl-sulfone | " |
| 34 | " | " | 2-Aminonaphtha-lene-8-$\beta$-sulfatoethyl-sulfone | " | " |
| 35 | " | " | 2-Aminonaphtha-lene-6-$\beta$-sulfatoethyl-sulfone-1-sulfonic acid | " | " |
| 36 | " | " | 2-Aminonaptha-lene-8-$\beta$-sulfatoethyl-sulfone-6-sulfonic acid | " | " |
| 37 | " | " | 2-Aminonaphtha-lene-6-$\beta$-sulfatoethyl-sulfone-1-sulfonic acid | 2-Aminonaphtha-lene-6-$\beta$-sulfatoethyl-sulfone | " |
| 38 | " | 3-Amino-acetanilide | " | 1-Aminobenzene-4-$\beta$-sulfatoethyl-sulfone | " |
| 39 | " | " | 2-Aminonaphtha-lene-8-$\beta$-sulfatoethyl-sulfone | 1-Aminobenzene-3-$\beta$-sulfatoethyl-sulfone | " |
| 40 | " | 2-Methoxy-5-methylaniline | 2-Aminonaphtha-lene-6-$\beta$-sulfatoethyl-sulfone | " | " |
| 41 | " | " | 2-Aminonaphtha-lene-8-$\beta$-sulfatoethyl-sulfone | " | " |
| 42 | " | 3-Carboxyvinyl-carbonyl-aminoaniline | 2-Aminonaphtha-lene-6-$\beta$-sulfato-ethylsulfone | " | " |
| 43 | " | 3-Carboxyethyl-carbonyl- | " | 1-Aminobenzene-4-$\beta$-sulfatoethyl- | " |

| Run No. | A Aromatic amine compound (V) | B Aniline compound (VI) | C Amine compound (III) | D Another amine compound (IV) | E Shade |
|---|---|---|---|---|---|
| | | -continued | | | |
| 44 | " | aminoaniline 2,5-Dimethylaniline | 2-Aminonaphthalene-5-β-sulfatoethylsulfone-1-sulfonic acid | sulfone 1-Aminobenzene-3-β-sulfatoethylsulfone | " |

EXAMPLE 3

2-Naphthylamine-3,6,8-trisulfonic acid (19.2 parts) was diazotized in a conventional manner, followed by coupling with 3-aminophenylurea (7.6 parts). The resulting monoazo intermediate was subjected to condensation with cyanuric chloride (9.23 parts) and 1-aminobenzene-4-β-sulfatoethylsulfone (14.1 parts) in that order. The condensate was further subjected to condensation with 1-aminobenzene-3-β-sulfatoethylsulfone (14.1 parts) at 60° to 70° C. within a pH of 4 to 5. Salting out with sodium chloride gave a monoazo compound represented by the following formula in a free acid form.

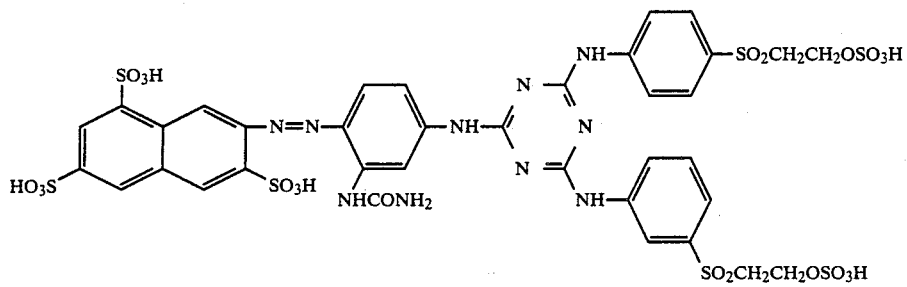

(λmax 420 nm)

EXAMPLE 4

Example 3 was repeated, but the 2-naphthylamine-3,6,8-trisulfonic acid, 3-aminophenylurea, 1-aminobenzene-4-β-sulfatoethylsulfone and 1-aminobenzene-3-β-sulfatoethylsulfone which were used in Example 3, were replaced by the aromatic amine compound shown in Column A of the following table, which corresponds to the formula (V), the aniline compound (VI) shown in Column B, the amine compound (III) shown in Column C and another amine compound (IV) shown in Column D, respectively, thereby obtaining the corresponding monoazo compound exhibiting a shade shown in Column E.

| Run No. | A Aromatic amine compound (V) | B Aniline compound (VI) | C Amine compound (III) | D Another amine compound (IV) | E Shade |
|---|---|---|---|---|---|
| 1 | 2-Naphthylamine-3,6,8-trisulfone acid | 3-Aminophenylurea | 1-Aminobenzene-3-β-sulfatoethylsulfone | 1-Aminobenzene-3-β-sulfatoethylsulfone | Golden Yellow |
| 2 | " | " | " | 1-Amino-2-methoxybenzene-5-β-sulfatoethylsulfone | " |
| 3 | " | " | " | 1-Amino-4-methoxybenzene-3-β-sulfatoethylsulfone | " |
| 4 | " | " | 1-Aminobenzene-4-β-sulfatoethylsulfone | 1-Aminobenzene-4-β-sulfatoethylsulfone | " |
| 5 | 2-Naphthylamine-3,6,8-trisulfonic acid | 3-Aminophenylurea | 1-Aminobenzene-4-β-sulfatoethylsulfone | 1-Amino-2-methoxybenzene-5-β-sulfatoethylsulfone | Golden Yellow |
| 6 | " | 3-Aminoacetanilide | " | 1-Aminobenzene-3-β-sulfatoethylsulfone | " |
| 7 | " | " | 1-Aminobenzene-3-β-sulfatoethylsulfone | " | " |
| 8 | " | 2-Methoxy-5-methylaniline | " | " | " |

-continued

| Run No. | A Aromatic amine compound (V) | B Aniline compound (VI) | C Amine compound (III) | D Another amine compound (IV) | E Shade |
|---|---|---|---|---|---|
| 9 | " | " | " | 1-Aminobenzene-4-β-sulfatoethyl-sulfone | " |
| 10 | " | 3-Carboxy-vinylamino aniline | " | " | " |
| 11 | 2-Naphthyl-amine-3,6,8-trisulfonic | 3-Carboxy-ethylamino-aniline | 1-Aminobenzene-3-β-sulfatoethyl-sulfone | 1-Aminobenzene-4-β-sulfatoethyl-sulfone | Golden yellow |
| 12 | " | 2,5-Dimethyl-aniline | " | " | " |
| 13 | " | 2,5-Dimethoxy-aniline | " | " | " |
| 14 | 2-Naphthyl-amine-4,6,8-trisulfonic acid | 3-Amino-phenylurea | 1-Aminobenzene-4-β-sulfatoethyl-sulfone | " | " |
| 15 | " | " | 1-Aminobenzene-3-β-sulfatoethyl-sulfone | 1-Aminobenzen-3-β-sulfatoethyl-sulfone | " |
| 16 | " | " | 1-Aminobenzene-4-β-sulfatoethyl-sulfone | " | " |
| 17 | 2-Naphthyl-amine-4,8-disulfonic acid | 3-Amino-phenylurea | 1-Aminobenzene-4-β-sulfatoethyl-sulfone | 1-Aminobenzene-3-β-sulfatoethyl-sulfone | Yellow |
| 18 | 2-Naphthyl-amine-1,5-disulfonic acid | " | " | " | " |
| 19 | 2-Naphthyl-amine-3,6-disulfonic acid | " | " | " | " |
| 20 | 2-Naphthyl-amine-5,7-disulfonic acid | " | " | " | " |
| 21 | 2-Naphthyl-amine-6,8-disulfonic acid | " | " | " | " |
| 22 | 2-Naphthyl-amine-4,8-disulfonic aicd | 1-Amino-naphthalene-6-sulfonic acid | " | " | " |
| 23 | 2-Naphthyl-amine-4,8-disulfonic acid | 1-Amino-naphthalene-8-sulfonic acid | 1-Aminobenzene-4-β-sulfatoethyl-sulfone | 1-Aminobenzene-3-β-sulfatoethyl-sulfone | Yellow |
| 24 | 2-Naphtyleamin-3,6,8-trisulfonic acid | 3-Amino-phenylurea | " | 1-N—Ethylamino-benzene-3-β-sulfatoethyl-sulfone | Golden yellow |
| 25 | " | " | 1-N—Ethylamino-benzene-4-β-sulfatoethyl-sulfone | 1-Aminobenzene-3-β-sulfatoethyl-sulfone | " |
| 26 | " | " | " | 1-Aminobenzene-4-β-sulfatoethyl-sulfone | " |
| 27 | " | " | 1-N—Ethylamino-benzene-3-β-sulfatoethyl-sulfone | 1-Aminobenzene-3-β-sulfatoethyl sulfone | " |
| 28 | 2-Naphthyl-amine-4,8-disulfonic acid | 2-Methoxy-5-methylaniline | 1-N—Ethylamino benzene-3-β-sulfatoethyl-sulfone | 1-Aminobenzene-3-β-sulfatoethyl-sulfone | Yellow |
| 29 | " | 1-Aminonaphtha-lene-8-sulfonic acid | 1-N—Ethylamino-benzene-3-β-sulfatoethyl-sulfone | " | " |
| 30 | 2-Naphthyl-amine-3,6,8-trisulfonic acid | 3-Amino-phenylurea | 1-Aminobenzene-4-vinylsulfone | " | Golden yellow |
| 31 | " | " | 1-Aminobenzene-4-β-sulfatoethyl-sulfone | 1-Aminobenzene-3-vinylsulfone | " |
| 32 | 2-Naphthyl-amine-4,8- | 3-Aminoacet-anilide-4- | " | " | " |

| | A<br>Aromatic | B | C | D | |
|---|---|---|---|---|---|
| Run<br>No. | amine<br>compound (V)<br>disulfonic acid | Aniline<br>compound (VI)<br>sulfonic acid | Amine<br>compound (III) | Another amine<br>compound (IV) | E<br>Shade |

EXAMPLE 5

Aniline-2,5-disulfonic acid (12.7 parts) was diazotized in a usual manner, followed by coupling with 3-aminoacetanilide-4-sulfonic acid (11.5 parts). The resulting intermediate was subjected to a first condensation with cyanuric chloride (9.23 parts), followed by a second condensation with 1-aminobenzene-4-β-sulfatoethylsulfone (14.1 parts). Ultimately, the resulting condensate was allowed to react with 1-aminobenzene-3-β-sulfatoethylsulfone (14.1 parts) at 60° to 70° C. within a pH of 4 to 5. Salting-out with sodium chloride gave a monoazo compound represented by the following formula in a free acid form.

EXAMPLE 6

Example 5 was repeated, but the aniline-2,5-disulfonic acid, 3-aminoacetanilide-4-sulfonic acid, 1-aminobenzene-4-β-sulfatoethylsulfone and 1-aminobenzene-3-β-sulfatoethylsulfone which were used in Example 5 were replaced by the aromatic amine compound shown in Column A of the following table which corresponds to the formula (V), the aniline compound (VI) shown in Column B, the amine compound (III) shown in Column C and another amine compound (VI) shown in Column D, respectively, thereby obtaining the corresponding monoazo compound exhibiting a shade shown in Column E. In the following table, the symbol Q denotes

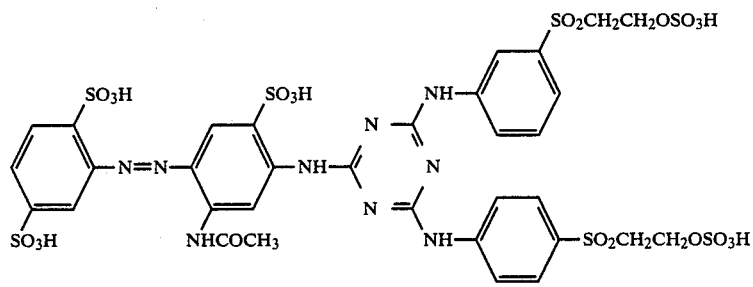

(λmax 375 nm)

—SO₂CH₂CH₂OSO₃H.

| Run<br>No. | A<br>Aromatic<br>amine<br>compound (V) | B<br>Aniline<br>compound (VI) | C<br>Amine<br>compound (III) | D<br>Another amine<br>compound (IV) | E<br>Shade |
|---|---|---|---|---|---|
| 1 | 2,5-disulfonic aniline (SO₃H, SO₃H, NH₂) | 4-ureido-2-sulfonic aniline (SO₃H, NHCONH₂, NH₂) | NH₂—⟨ ⟩—Q (meta) | C₂H₅NH—⟨ ⟩—Q (meta) | Yellow |
| 2 | " | " | NH₂—⟨ ⟩—Q (meta) | NH₂—⟨ ⟩—Q (meta) | " |
| 3 | " | " | NH₂—⟨ ⟩—Q (para) | NH₂—⟨ ⟩—Q (para) | " |
| 4 | " | " | NH₂—naphthyl—Q | NH₂—⟨ ⟩—Q (meta) | " |

-continued

| Run No. | A Aromatic amine compound (V) | B Aniline compound (VI) | C Amine compound (III) | D Another amine compound (IV) | E Shade |
|---|---|---|---|---|---|
| 5 | 2,4-disulfo aniline (SO₃H, NH₂, SO₃H) | 2-amino-5-acetylamino benzenesulfonic acid (SO₃H, NH₂, NHCOCH₃) | 3-Q-aniline (NH₂, Q at meta) | 3-Q-aniline (NH₂, Q at meta) | Yellow |
| 6 | " | " | 4-Q-aniline (NH₂, Q at para) | 4-Q-aniline | " |
| 7 | " | " | 6-amino-1-Q-naphthalene | 3-Q-aniline | " |
| 8 | " | " | 4-Q-aniline | N-ethyl-3-Q-aniline (C₂H₅-NH, Q) | " |
| 9 | 2,4-disulfo aniline | 2-amino-5-(phenylureido)benzenesulfonic acid (SO₃H, NH₂, NHCONHC₆H₅) | 3-Q-aniline | 4-Q-aniline | Yellow |
| 10 | " | " | 2-amino-6-Q-naphthalene-1-sulfonic acid | 3-Q-aniline | " |
| 11 | 2,5-disulfo aniline (SO₃H, NH₂, HO₃S) | 2-amino-5-acetylamino benzenesulfonic acid | 2-methoxy-5-methyl-4-Q-aniline (OCH₃, NH₂, Q, CH₃) | 3-Q-aniline | " |
| 12 | 2-sulfo aniline (SO₃H, NH₂) | " | N-ethyl-4-Q-aniline (C₂H₅-NH, Q) | 4-Q-aniline | " |
| 13 | 2,4-disulfo aniline | 2-amino-5-ureido benzenesulfonic acid (SO₃H, NH₂, NHCONH₂) | 4-Q-aniline | 3-Q-aniline | Yellow |

-continued

| Run No. | A Aromatic amine compound (V) | B Aniline compound (VI) | C Amine compound (III) | D Another amine compound (IV) | E Shade |
|---|---|---|---|---|---|
| 14 | " | 1-amino-2-naphthalenesulfonic acid (SO$_3$H, NH$_2$ on naphthalene) | " | " | " |
| 15 | " | 2-amino-4-acetamidobenzenesulfonic acid (SO$_3$H, NH$_2$, NHCOCH$_3$) | NH$_2$—C$_6$H$_4$—Q | 2-amino-4-Q-anisole (CH$_3$O, NH$_2$, Q) | " |
| 16 | " | " | NH$_2$—C$_6$H$_4$—Q (meta) | 4-amino-2-Q-anisole (Q, NH$_2$, OCH$_3$) | " |

EXAMPLE 7

2-Naphthylamine-3,6,8-trisulfonic acid (19.2 parts) was diazotized in a conventional manner, followed by coupling with 3-aminophenylurea (7.6 parts). The resulting monoazo intermediate was subjected to condensation with cyanuric chloride (9.23 parts) and 2-aminonaphthalene-6-β-sulfatoethylsulfone-1-sulfonic acid (21.7 parts) in that order. The condensate was further subjected to condensation with 1-aminobenzene-3-β-sulfatoethylsulfone (14.1 parts) at 60° to 70° C. within a pH of 4 to 5. Salting out with sodium chloride gave a monoazo compound represented by the following formula in a free acid form.

EXAMPLE 8

Example 7 was repeated, but the 2-naphthylamine-3,6,8-trisulfonic acid, 3-aminophenylurea, 2-aminonaphthalene-6-β-sulfatoethylsulfone-1-sulfonic acid and 1-aminobenzene-3-β-sulfatoethylsulfone which were used in Example 7, were replaced by the aromatic amine compound as shown in Column A of the following table, which corresponds to the formula (V), the aniline compound (VI) as shown in column B, the amine compound (III) as shown in Column C and another amine compound (IV) as shown in Column D, respectively, thereby obtaining the corresponding monoazo compound exhibiting a shade as shown in Column E.

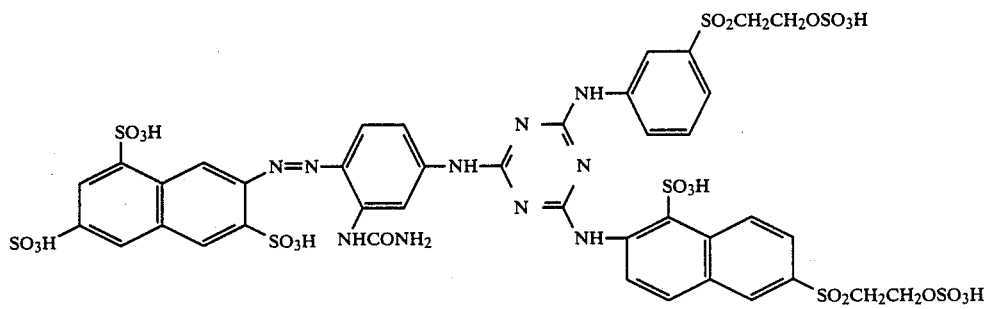

(λmax 425 nm)

| Run No. | A Aromatic amine compound (V) | B Aniline compound (VI) | C Amine compound (III) | D Another amine compound (IV) | E Shade |
|---|---|---|---|---|---|
| 1 | 2-Naphthylamine-3,6,8-trisulfonic acid | 3-Aminophenylurea | 2-Aminonaphthalene-6-β-sulfatoethyl-sulfone-1-sulfonic acid | 1-Aminobenzene-4-β-sulfatoethyl-sulfone | Golden yellow |

-continued

| Run No. | A<br>Aromatic amine compound (V) | B<br>Aniline compound (VI) | C<br>Amine compound (III) | D<br>Another amine compound (IV) | E<br>Shade |
|---|---|---|---|---|---|
| 2 | " | " | " | 1-N—Ethylamino-benzene-3-β-sulfatoethyl-sulfone | " |
| 3 | " | " | " | 1-Amino-2-methoxy-benzene-5-β-sulfatoethyl-sulfone | " |
| 4 | 2-Naphthyl-amine-3,6,8-trisulfonic acid | 3-Amino-phenylurea | 2-Amino-naphthalene-6-β-sulfatoethyl-sulfone-1-sulfonic acid | 1-Amino-4-methoxy-benzene-3-β-sulfatoethyl-sulfone | Golden yellow |
| 5 | " | " | 2-Amino-naphthalene-5-β-sulfatoethyl-sulfone-1-sulfonic acid | 1-Aminobenzene-3-β-sulfatoethyl-sulfone | " |
| 6 | " | " | " | 1-Aminobenzene-4-β-sulfatoethyl-sulfone | " |
| 7 | " | " | 2-Amino-naphthalene-6-β-sulfatoethyl-sulfone | " | " |
| 8 | 2-Naphthyl-amine-3,6,8-trisulfonic acid | 3-Amino-phenylurea | 2-Aminonaphtha-lene-6-β-sulfato-ethylsulfone | 1-Aminobenzene 3-β-sulfato-ethylsulfone | Golden yellow |
| 9 | " | " | 2-Aminonaphtha-lene-5-β-sulfato-ethylsulfone | 1-Aminobenzene-4-β-sulfato-ethylsulfone | " |
| 10 | " | " | " | 1-Aminobenzene-3-β-sulfato-ethylsulfone | " |
| 11 | " | 3-Amino-acetanilide | 2-Aminonaphtha-lene-6-β-sulfato-ethylsulfone-1-sulfonic acid | " | " |
| 12 | " | " | " | 1-Aminobenzene-4-β-sulfatoethyl-sulfone | " |
| 13 | 2-Naphthyl-amine-3,6,8-trisulfonic acid | 2-Methoxy-5-methylaniline | 2-Aminonaphtha-lene-6-β-sulfato-ethylsulfone-1-sulfonic acid | 1-Aminobenzene-3-β-sulfatoethyl-sulfone | Golden yellow |
| 14 | " | 3-Carboxy-vinylcarbonylamino aniline | " | " | " |
| 15 | " | 3-Carboxy-ethylcarbonylamino aniline | " | " | " |
| 16 | " | 2,5-Dimethyl-aniline | " | " | " |
| 17 | 2-Naphthyl-amine-4,6,8-trisulfonic acid | 3-Amino-phenylurea | " | " | " |
| 18 | 2-Naphthyl-amine-4,6,8-trisulfonic acid | 3-Amino-phenylurea | 2-Aminonaphtha-lene-6-β-sulfato-ethylsulfone-1-sulfonic acid | 1-Aminobenzene-4-β-sulfato-ethylsulfone | Golden yellow |
| 19 | " | " | 2-Aminonaphtha-lene-6-β-sulfato-ethylsulfone | " | " |
| 20 | " | " | " | 1-Aminobenzene-3-β-sulfato-ethylsulfone | " |
| 21 | 2-Naphthyl-amine-3,6,8-trisulfonic acid | " | " | 2-Aminonaphtha-lene-6-β-sulfatoethyl-sulfone | " |
| 22 | 2-Naphthyl-amine-4,8-disulfonic acid | " | " | 1-Aminobenzene-3-β-sulfato-ethylsulfone | " |
| 23 | 2-Naphthyl-amine-1,5-disulfonic acid | 3-Amino-phenylurea | 2-Aminonaphtha-lene-6-β-sulfato-ethylsulfone | 1-Aminobenzene-3-β-sulfato-ethylsulfone | Golden yellow |

-continued

| Run No. | A Aromatic amine compound (V) | B Aniline compound (VI) | C Amine compound (III) | D Another amine compound (IV) | E Shade |
|---|---|---|---|---|---|
| 24 | 2-Naphthylamine-3,6-disulfonic acid | " | " | " | " |
| 25 | 2-Naphthylamine-3,6,8-trisulfonic acid | " | " | 1-N—Ethylaminobenzene-3-β-sulfatoethylsulfone | " |
| 26 | " | " | 2-Aminonaphthalene-5-β-sulfatoethylsulfone | " | " |
| 27 | " | " | " | 1-N—Ethylaminobenzene-4-β-sulfatoethylsulfone | " |
| 28 | 2-Naphthylamine-3,6,8-trisulfonic acid | 3-Aminophenylurea | 2-Aminonaphthalene-5-β-sulfatoethylsulfone-1-sulfonic acid | 1-N—Ethylaminobenzene-4-β-sulfatoethylsulfone | Golden yellow |
| 29 | " | " | 2-Aminonaphthalene-6-vinylsulfone-1-sulfonic acid | 1-Aminobenzene-3-β-sulfatoethylsulfone | " |
| 30 | " | " | " | 1-N—Ethylamino-3-β-sulfatoethylsulfone | " |
| 31 | " | 3-Aminoacetanilide-4-sulfonic acid | 2-Aminonaphthalene-6-β-sulfatoethylsulfone | 1-Aminobenzene-3-β-sulfatoethylsulfone | " |
| 32 | 2-Naphthylamine-3,6-disulfonic acid | " | 2-Aminonaphthalene-5-μ-sulfatoethylsulfone | " | " |

DYEING EXAMPLE 1

The monoazo compound obtained in Example 1 (0.3 part) was dissolved in water (200 parts), and cotton (10 parts) and sodium sulfate (8 parts) were added thereto. The bath was heated up to 60° C. and then sodium carbonate (4 parts) was added to the bath. Dyeing was continued for 1 hour at that temperature. Thereafter, the cotton was washed with water and soaped to obtain a dyed product of a deep yellow color which was excellent in various fastness properties. The monoazo compound gave excellent reproducibility of the dyeing, irrespective of changes in dyeing temperature, bath ratio and salt concentration in some degree.

DYEING EXAMPLE 2

Using the monoazo compounds obtained in Examples 2, 5 and 6, dyeing procedures similar to that of Dyeing Example 1 are carried out to obtain the results similar to those of Dyeing Example 1.

DYEING EXAMPLE 3

The monoazo compound obtained in Example 3 (0.3 part) was dissolved in water (200 parts), and cotton (10 parts) and sodium sulfate (9 parts) were added thereto. The bath was heated up to 60° C., and then sodium carbonate (4 parts) was added to the bath. Dyeing was continued for 1 hour at that temperature. Thereafter, the cotton was washed with water and soaped to obtain a dyed product of a deep yellow color which was excellent in various fastness properties. The monoazo compound gave excellent reproducibility of the dyeing, irrespective of changes in dyeing temperature, bath ratio and salt concentration in some degree.

DYEING EXAMPLE 4

Using the monoazo compounds obtained in Examples 4, 7 and 8, dyeing procedures similar to that of Dyeing Example 3 are carried out to obtain the results similar to those of Dyeing Example 3.

What is claimed is:

1. A compound of the following formula,

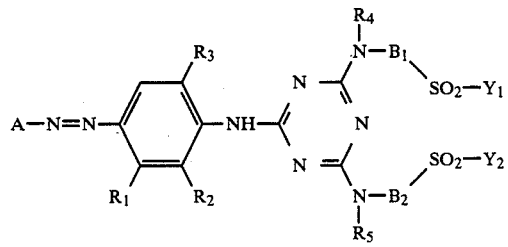

wherein A is phenyl substituted with a water-solubilizing group or naphthyl substituted with a water-solubilizing group, $B_1$ and $B_2$ independently of one another are each phenylene unsubstituted or substituted with methyl, ethyl, methoxy, ethoxy, halogeno, sulfo or carboxy, or naphthlene unsubstituted or substituted with sulfo, $R_1$ is hydrogen, halogeno, $C_{1-4}$ alkyl, $C_{1-4}$ alkoxy, ureido or acylamino, said acylamino being selected from —$NHCOC_{1-4}$ alkyl, —$NHCOC_{2-4}$ alkenyl and benzoylamino, in which the alkyl and alkenyl are unsubstituted or substituted with sulfo, carboxy or halogeno, and the benzoyl is unsubstituted or substituted with sulfo, carboxy, methyl or halogeno, $R_2$ is hydrogen or taken together with $R_1$ forms a benzene ring unsubstituted or substituted with sulfo, $R_3$ is hydrogen, $C_{1-4}$ alkyl, $C_{1-4}$ alkoxy or sulfo, $R_4$ and $R_5$ independently of one another are each hydrogen or alkyl unsubstituted or substituted with hydroxy, cyano, $C_{1-4}$ alkoxy, halogeno, carboxy, carbamoyl, $C_{1-4}$ alkoxycarbonyl, $C_{1-4}$ alkylcarbonyloxy, sulfo or sulfamoyl, and $Y_1$ and $Y_2$ independently of one another are each vinyl or —$CH_2CH_2L$ in which L is a group capable of being split by the action of an alkali.

2. A compound according to claim 1, wherein A is the phenyl represented by the following formula,

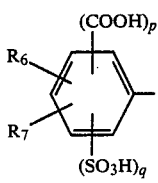

wherein $R_6$ and $R_7$ independently of one another are each hydrogen, chloro, methyl or methoxy, p is 0 or 1 and q is 1 or 2, provided that p+q is 1 or 2.

3. A compound according to claim 1, wherein A is the naphthyl represented by the following formula,

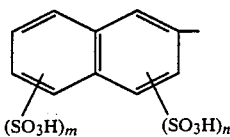

wherein m is 1 or 2 and n is 0 or 1, provided that m+n is 2 or 3.

4. A compound according to claim 1, wherein $B_1$ and $B_2$ independently of one another are each phenylene unsubstituted or substituted with methyl, methoxy, ethyl, ethoxy, chloro, bromo, sulfo or carboxy, or naphthylene unsubstituted or substituted with one sulfo.

5. A compound according to claim 1, wherein $B_1$ and $B_2$ independently of one another are each unsubstituted phenylene or methyl- or methoxy-substituted phenylene.

6. A compound according to claim 1, wherein $R_1$ is hydrogen, chloro, methyl, methoxy, ureido or amino substituted with acetyl, propionyl, —$COC_2H_4COOH$, —$COCH=CHCOOH$ or benzoyl, $R_2$ is hydrogen or takes together with $R_1$ to form a benzene ring substituted with one sulfo, and $R_3$ is hydrogen, methyl or methoxy.

7. A compound according to claim 1, wherein $R_4$ and $R_5$ independently of one another are each hydrogen, methyl or ethyl.

8. A compound according to claim 1, wherein both $Y_1$ and $Y_2$ are β-sulfatoethyl or vinyl.

9. A compound of the following formula in a free acid form,

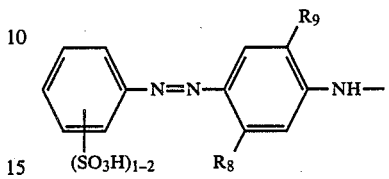

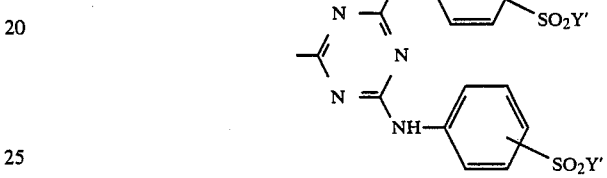

wherein $R_8$ is ureido or acetylamino and $R_9$ is hydrogen, or $R_8$ is methyl and $R_9$ is methoxy, and $R_{10}$ is hydrogen, methyl or ethyl, and Y' is vinyl or β-sulfatoethyl.

10. A compound of the following formula in a free acid form,

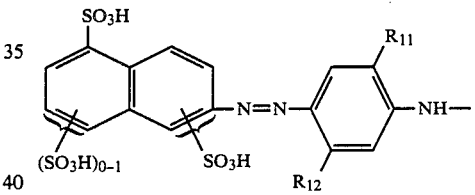

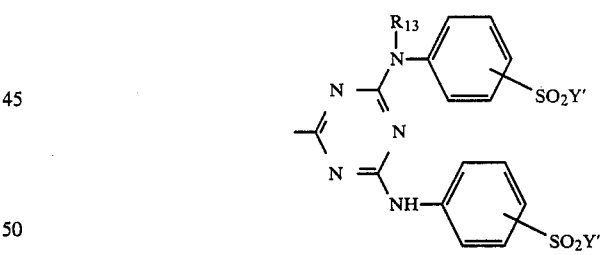

wherein $R_{11}$ is hydrogen and $R_{12}$ is ureido or acetylamino, or $R_{11}$ is methoxy and $R_{12}$ is methyl, and $R_{13}$ is hydrogen, methyl or ethyl, and Y' is vinyl or β-sulfatoethyl.

11. A compound according to claim 1, wherein L is sulfato, thiosulfato, acetoxy or chloro.

* * * * *